US011555081B2

(12) United States Patent
Morone et al.

(10) Patent No.: US 11,555,081 B2
(45) Date of Patent: Jan. 17, 2023

(54) MULTIFUNCTIONAL BISACYLPHOSPHINE OXIDE PHOTOINITIATORS

(71) Applicant: IGM RESINS ITALIA S.R.L., Milan (IT)

(72) Inventors: Marika Morone, Lipomo (IT); Gianni Casaluce, Turate (IT); Gabriele Norcini, Comabbio (IT); Stephen Postle, Glen Rock, NJ (US)

(73) Assignee: IGM RESINS ITALIA S.R.L., Milan (IT)

( * ) Notice: Subject to any disclaimer, the term of this patent is extended or adjusted under 35 U.S.C. 154(b) by 161 days.

(21) Appl. No.: 17/273,426

(22) PCT Filed: Aug. 2, 2019

(86) PCT No.: PCT/IB2019/056596
§ 371 (c)(1),
(2) Date: Mar. 4, 2021

(87) PCT Pub. No.: WO2020/049378
PCT Pub. Date: Mar. 12, 2020

(65) Prior Publication Data
US 2021/0347919 A1  Nov. 11, 2021

(30) Foreign Application Priority Data
Sep. 7, 2018  (IT) .................. 102018000008431

(51) Int. Cl.
| | |
|---|---|
| *C08F 2/50* | (2006.01) |
| *C08F 222/10* | (2006.01) |
| *C07F 9/53* | (2006.01) |
| *C09D 4/00* | (2006.01) |
| *C09D 11/101* | (2014.01) |
| *C09D 11/30* | (2014.01) |

(52) U.S. Cl.
CPC .............. *C08F 2/50* (2013.01); *C07F 9/5337* (2013.01); *C08F 222/103* (2020.02); *C09D 4/00* (2013.01); *C09D 11/101* (2013.01); *C09D 11/30* (2013.01)

(58) Field of Classification Search
CPC ...... C08F 2/50; C08F 222/103; C09D 11/101; C09D 11/30; C09D 4/00; C08G 65/335; C08G 65/334; C07F 9/5337
See application file for complete search history.

(56) References Cited

U.S. PATENT DOCUMENTS

| | | | |
|---|---|---|---|
| 7,687,657 B2 | 3/2010 | Lee et al. | |
| 8,633,258 B2 | 1/2014 | Bishop | |
| 9,701,700 B2 | 7/2017 | Gruetzmacher et al. | |
| 10,106,629 B2 * | 10/2018 | Norcini | ............... G03F 7/029 |
| 2013/0328028 A1 | 12/2013 | Lee | |
| 2015/0197651 A1 | 7/2015 | Fukagawa | |

FOREIGN PATENT DOCUMENTS

| | | |
|---|---|---|
| EP | 3031798 | 6/2016 |
| WO | 2015181332 | 12/2015 |
| WO | 2017086224 | 5/2017 |
| WO | 2017145484 | 8/2017 |

OTHER PUBLICATIONS

International Search Report and written opinion issued by the EPO for PCT/IB2019/056596 dated Oct. 10, 2019.

* cited by examiner

*Primary Examiner* — Sanza L. McClendon
(74) *Attorney, Agent, or Firm* — Silvia Salvadori

(57) ABSTRACT

The present invention relates to multifunctional bisacylphosphine oxides, which are useful as photoinitiators, and to compositions comprising said photoinitiators. The invention also relates to a process for photocuring and to articles of manufacture prepared by said process.

19 Claims, No Drawings

MULTIFUNCTIONAL BISACYLPHOSPHINE OXIDE PHOTOINITIATORS

This application is a U.S. national stage of PCT/IB2019/056596 filed on 02 Aug. 2019, which claims priority to and the benefit of Italian Application No. 102018000008431 filed on 07 Sep. 2018 the contents of which are incorporated herein by reference in their entireties.

TECHNICAL FIELD

The present invention relates to multifunctional bisacylphosphine oxides, which are useful as photoinitiators, and to compositions comprising said photoinitiators.

PRIOR ART

Bisacylphosphine oxides are widely used as photoinitiators in radiation curable compositions. They are highly reactive and non-yellowing and have a small absorption band in the long wave UV around 350-420 nm which makes them also suitable for LED lamps. All these characteristics make of bisacylphosphine oxides a unique class of photoinitiators suitable for a wide range of applications, such as wood coating, 3D printing, composites, medical devices, graphic arts, protective coating.

One of the major limitations of the bisacylphosphine oxides is their solubility and compatibility with the photocurable compositions. In fact, the use of such photoinitiators is sometimes associated with undesired crystallization effect which, in the final coating, can result in optical clarity and reactivity loss. In the last years, many efforts were made in order to synthesized new bisacylphosphine oxides with improved solubility in photocurable compositions, some examples are reported in U.S. Pat. Nos. 7,687,657 and 8,633,258.

Moreover, when radiation curable compositions are used for food packaging, toys or dental applications, the amount of photoinitiators and related degradation products that are able to diffuse out of the cured coating into the surrounding medium (migration) it's a critical issue. Low molecular weight compounds are usually not completely built into the polymer network and are prone to be extracted or to diffuse out of the cured composition. Therefore, there is a continuous effort in designing photoinitiators having a reduced tendency to migrate out or to be extracted from the cured composition.

One approach to overcome these problems is to use photoinitiators which contain an ethylenically unsaturated moiety, for examples U.S. Pat. No. 7,687,657, US2013/0328028, US2015/0197651, WO2017/086224 and WO2017/145484 describe derivatives of bisacylphosphine oxides with a (meth)acrylated functionality. The ethylenically unsaturated group enables the photoinitiator to be incorporated into the polymeric structure during the curing process. Unfortunately, the presence of an ethylenically unsaturated group limit the thermal and storage stability of these systems.

An alternative approach is to use photoinitiators of increased molecular size, which have an increased probability to be blocked into the cured products, resulting in reduced levels of migratable and/or extractable products. This solution is disclosed in U.S. Pat. No. 9,701,700, WO2017/086224 and WO2018/047484.

However, one skilled in the art knows that both kind of photoinitiators have a tendency to lose reactivity. Hence, considerable amounts of active substance are often required in order to reach the desired curing speed, thereby also increasing the viscosity to an undesirable level for a great number of applications of radiation curable compositions, such as e.g. inkjet printing. Unfortunately, above a concentration of 10-12% of non-acrylate functional materials said compounds either start to behave as plasticizers or just reduce the crosslink density of the cured film to a point where its mechanical properties are impaired.

Another approach is to combine the advantages of greater molecular size and ethylenic unsaturation in the same compound as disclosed in U.S. Pat. No. 9,701,700. In this document other than high molecular weight bisacylphosphine oxides containing ethylenic unsaturation, bisacylphosphine oxides with a high molecular weight are also described. In particular, are described bisacylphosphine oxides that show (a) a wide range of possible substitution on acyl group and (b) a linking group $R^*[C_{(2)}HR^9-C_{(1)}(R^9)_2-]_n$, where $C_{(1)}$ is the atom linked to the phosphorous and $R^*$ is a polyol residue. Regarding the polyol moieties, in the examples only bisacylphosphine oxides are depicted wherein the polyol residue is a trimethylolpropane (Example 25a). Also said bisacylphosphine oxides, even if effective, can however show some drawbacks (e.g. solubility), as it will be discussed herein below in the present description.

As mention before, the solubility and compatibility with the photocurable system of the bisacylphosphine oxides is still a critical issue, that means that there continues to be a demand for other bisacylphopshine oxides having a reduce tendency to migrate or to be extracted and an improved compatibility with radiation-curable coating systems.

We have now found a series of novel multifunctional bisacylphoshine oxide photoinitiators with improved solubility, high reactivity and stability, and a very low tendency to migrate and/or to be extracted. In addition to this, in a completely unexpected way, the compounds of formula (I) showed a greater reactivity even when compared with compound of example 25a (U.S. Pat. No. 9,701,700) even if the molecular weight of the novel compound is always higher.

The novel multifunctional bisacylphosphine oxides contain an alkoxylated residue able to enhance the solubility in the formulation without affecting the reactivity that remain comparable or superior to the system not alkoxylated.

DESCRIPTION OF THE INVENTION

According to one of its aspects, the present invention relates to photoinitiators of formula (I):

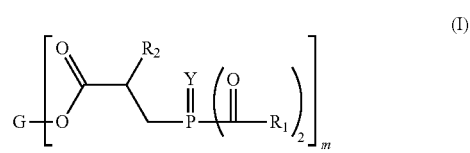

wherein:
m is from 2 to 10;
G is an alkoxylated polyhydroxy residue, wherein the polyhydroxy compound from which is derived has at least m hydroxy groups;
$R_1$ is selected from
a $C_1$-$C_{18}$ alkyl group, optionally interrupted by one or more oxygen and/or sulfur atoms and/or one or more substituted or unsubstituted imino groups
a $C_6$-$C_{12}$ aryl group;
a $C_5$-$C_{12}$ cycloalkyl group,
a five- to six-membered heterocyclic group, containing oxygen and/or nitrogen and/or sulfur atoms,
where each of said groups may be independently substituted by aryl, alkyl, aryloxy, alkoxy, heterocyclic groups and/or heteroatoms;
$R_2$ is hydrogen or a $C_1$-$C_4$ alkyl group; and
Y is O or S;
provided that when G is

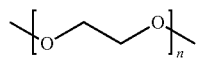

wherein n is 100, m is 2, $R_2$ is hydrogen and Y is O, then $R_1$ is not a 2,4,6-trimethylphenyl group (mesityl group).

According to another of its aspects, the present invention relates to a photocurable composition comprising:
a) from 50 to 99.9% by weight, preferably from 70 to 98.9% by weight, of the solids content, excluding water or solvent, of at least one ethylenically unsaturated compound;
b) from 0.1 to 35% by weight, preferably from 0.1 to 20% by weight, and more preferably from 0.2 to 15% by weight, of the solids content, excluding ethylenically unsaturated compounds, water or solvent, of at least one compound of formula (I), as defined above.

DETAILED DESCRIPTION OF THE INVENTION

According to a preferred embodiment, m is from 3 to 8, most preferably from 3 to 6.

G may be any suitable alkoxylated polyhydroxy residue, obtainable, for instance, by alkoxylation of polyhydroxy compounds.

According to a preferred embodiment, G is an alkoxylated polyhydroxy residue, wherein the polyhydroxy compound from which is derived has m hydroxy groups Such alkoxylated polyhydroxy compounds are well known in the art and can be selected from alkoxylated polyhydroxy polyethers; which can be both aliphatic or aromatic; alkoxylated polyhydroxy polyesters; alkoxylated polyhydroxy polyamides; alkoxylated polyhydroxy polyimides; alkoxylated polyhydroxy polycarbonates; alkoxylated styrene allyl alcohols copolymers; alkoxylated polyols; which can be oligomeric and polymeric; and mixture thereof.

Preferably, G derives from oligomeric or polymeric polyols.

Examples of suitable polyols are ethylene glycol, propylene glycol, 1,2-butanediol, 1,3-butanediol, 1,4-butanediol, 2,3-butanediol, 1,6-hexanediol, 1,2-hexanediol, 1,5-hexanediol, 2,5-hexanediol, neopentylglycol, glycerol, di-glycerol, tri-glycerol, triethanolamine, trimethylol propane, di-trimethylol propane, pentaerythritol, di-pentaeritrithol, sugar alcohols, such as sorbitol and xylitol, and mixtures thereof.

In G, said oligomeric and polymeric polyols are alkoxylated, for example ethoxylated and/or propoxylated and/or butoxylated.

Other suitable examples of alkylated polyhydroxy residues are the alkoxylated polyamines mentioned above and polyalkoxylated diamines, such as ethylene diamine and 1,3-propylene diamine.

In the alkoxylated residues, each group reactive toward a suitable alkylene oxide can bring from 0 to 15 alkoxy units, preferably from 1 to 10 alkoxy units, more preferably from 2 to 5, with the proviso that at least 1 alkoxy unit is present in the compound of formula (I).

Preferably, G has a number average molecular weight not greater than 2000 Dalton, more preferably not greater than 1000 Dalton, and most preferably not greater than 800 Dalton.

In a preferred embodiment G derives from polyols which have been ethoxylated and/or propoxylated.

In another preferred embodiment, G is selected from ethoxylated and/or propoxylated ethylene glycol; ethoxylated and/or propoxylated propylene glycol; ethoxylated and/or propoxylated 1;2-butanediol; ethoxylated and/or propoxylated 1;3-butanediol; ethoxylated and/or propoxylated 1;4-butanediol; ethoxylated and/or propoxylated 2;3-butanediol; ethoxylated and/or propoxylated 1;6-hexanediol; ethoxylated and/or propoxylated 1;2-hexanediol; ethoxylated and/or propoxylated 1;5-hexanediol; ethoxylated and/or propoxylated 2;5-hexanediol; ethoxylated and/or propoxylated neopentylglycol; ethoxylated and/or propoxylated glycerol; ethoxylated and/or propoxylated trimethylolpropane; ethoxylated and/or propoxylated di-trimethylolpropane; ethoxylated and/or propoxylated pentaerythritol; ethoxylated and/or propoxylated di-pentaerythritol; ethoxylated and/or propoxylated sorbitol; ethoxylated and/or propoxylated triethanolamine.

In a most preferred embodiment, G is selected from ethoxylated and/or propoxylated glycerol; ethoxylated and/or propoxylated trimethylolpropane; ethoxylated and/or propoxylated di-trimethylolpropane; and ethoxylated and/or propoxylated pentaerythritol; ethoxylated and/or propoxylated di-pentaerythritol; ethoxylated and/or propoxylated sorbitol; ethoxylated and/or propoxylated triethanolamine.

In formula (I) of the present disclosure:
$C_1$-$C_{18}$ alkyl is preferably a linear or branched, saturated alkyl, which can be unsubstituted or substituted by aryl, alkyl, aryloxy, alkoxy, heteroatoms and/or heterocyclic groups, and includes, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenyl-ethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-hydroxyethyl, 2-hydroxypropyl, 3-hydroxypropyl, 4-hydroxybutyl, 6-hydroxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, 2-methoxycarbonylethyl, 2-ethoxycarbonylethyl, 2-butoxycarbonylpropyl, 1,2-di(methoxycarbonyl) ethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, butylthiomethyl, 2-dodecylthioethyl, 2-phenylthioethyl, 2,2,2-trifluoroethyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-di methylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, and 6-phenoxyhexyl;

$C_1$-$C_4$ alkyl is preferably a linear or branched, saturated, unsubstituted alkyl group such as, for example, methyl, ethyl, propyl, isopropyl, n-butyl, sec-butyl or tert-butyl;

$C_6$-$C_{12}$ aryl may be unsubstituted or substituted by aryl, alkyl, aryloxy, alkoxy, heteroatoms and/or heterocyclic groups and includes, for example, phenyl, tolyl, xylyl, 4-biphenylyl, 2-, 3- or 4-chlorophenyl, 2,6- or 2,4-dichlorophenyl, 2,4,6-trichlorophenyl, 2-, 3- or 4-fluorophenyl, 2,6- or 2,4-fluorophenyl, 2,4,6-trifluorophenyl, 2-, 3- or 4-methylphenyl, 2,6- or 2,4-dimethylphenyl, 2,4,6-trimethylphenyl, 2-, 3- or 4-ethylphenyl, 2,6- or 2,4-diethylphenyl, 2-, 3- or 4-iso-propylphenyl, 2-, 3- or 4-tert-butylphenyl, dodecylphenyl, 2-, 3- or 4-methoxyphenyl, 2,6- or 2,4-dimethoxyphenyl, 2-, 3- or 4-ethoxyphenyl, 2,6- or 2,4-diethoxyphenyl, hexyloxyphenyl, α-naphthyl, β-naphthyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-di methylaminophenyl, 4-acetylphenyl, methoxyethylphenyl and ethoxymethylphenyl;

$C_5$-$C_{12}$ cycloalkyl may be unsubstituted or substituted by aryl, alkyl, aryloxy, alkoxy, heteroatoms and/or heterocyclic groups and includes, for example, cyclopentyl, cyclohexyl, cyclooctyl, cyclododecyl, methylcyclopentyl, 2,5-di methylcyclopentyl, methylcyclohexyl, 2,6-di methylcyclohexyl, 2,6-diethylcyclohexyl, butylcyclohexyl, methoxycyclohexyl, 2,6-di methoxycyclohexyl, 2,6-diethoxycyclohexyl, butylthiocyclohexyl, chlorocyclohexyl, 2,6-dichlorocyclohexyl and 2,5-dichlorocyclopentyl; or $C_5$-$C_{12}$ cycloalkyl may be a saturated or unsaturated, unsubstituted or substituted bicyclic system, for example norbornyl or norbornenyl, a tricyclic system, such as for example adamantyl;

a five- to six-membered, oxygen and/or nitrogen and/or sulfur atom-containing heterocyclic group includes for example, furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl and tert-butylthiophenyl.

Preferably, $R_1$ is selected from phenyl, tolyl, xylyl, 2-, 3- or 4-chlorophenyl, 2,6- or 2,4-dichlorophenyl, 2,4,6-trichlorophenyl, 2-, 3- or 4-methylphenyl, 2,6- or 2,4-dimethylphenyl, 2,4,6-trimethylphenyl, 2-, 3- or 4-ethylphenyl, 2,6- or 2,4-diethylphenyl, 2-, 3- or 4-iso-propylphenyl, 2-, 3- or 4-tert-butylphenyl, 2-, 3- or 4-methoxyphenyl, 2,6- or 2,4-dimethoxyphenyl, 2,6- or 2,4-diethoxyphenyl, α-naphthyl, β-naphthyl, methylnaphthyl, 4-bromophenyl, 2- or 4-nitrophenyl, 2,4- or 2,6-dinitrophenyl, 4-dimethylaminophenyl, 4-acetylphenyl, cyclopentyl, cyclohexyl, 2,5-di methylcyclopentyl, 2,6-dimethylcyclohexyl, 2,6-diethylcyclohexyl, 2,6-dimethoxycyclohexyl, 2,6-diethoxycyclohexyl, 2,6-dichlorocyclohexyl, 2,5-dichlorocyclopentyl, adamantyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, 2- or 3-furyl, 2- or 3-thiophenyl, 2- or 3-pyrryl and dimethylpyrryl.

More preferably, $R_1$ is selected from phenyl, 2,6-dichlorophenyl, 2,4,6-trichlorophenyl, 2,6-dimethylphenyl, 2,4,6-trimethylphenyl, 2,6-diethylphenyl, 2,6-dimethoxyphenyl, 2,6-diethoxyphenyl, α-naphthyl, 2,6-dinitrophenyl, 2,6-dimethylcyclohexyl, 2,6-diethylcyclohexyl, 2,6-dimethoxycyclohexyl, 2,6-diethoxycyclohexyl or 2,6-dichlorocyclohexyl, tert-butyl, pentyl, hexyl, heptyl, octyl and 2-ethylhexyl.

Most preferably, $R_1$ is selected from phenyl, 2,6-dichlorophenyl, 2,4,6-trichlorophenyl, 2,6-dimethylphenyl, 2,4,6-trimethylphenyl, 2,6-dimethoxyphenyl and tert-butyl.

Preferably, $R_2$ is selected from hydrogen, methyl and ethyl, more preferably is hydrogen or methyl, most preferably is hydrogen.

Y is preferably O.

Preferred multifunctional bisacylphosphine oxides according to formula (I) are described in Table 1, for illustrative purposes only, without being limited thereto. In case of a polymeric multifunctional residue it is evident for those skilled in the art that the described multifunctional bisacylphosphine oxide photoinitiators have a distribution in molecular weight. In the structures, a, b, c, d, e and f are integer and they are independently comprised between 0 and 15, with the proviso that at least one of them is different from zero.

TABLE 1
PI-1
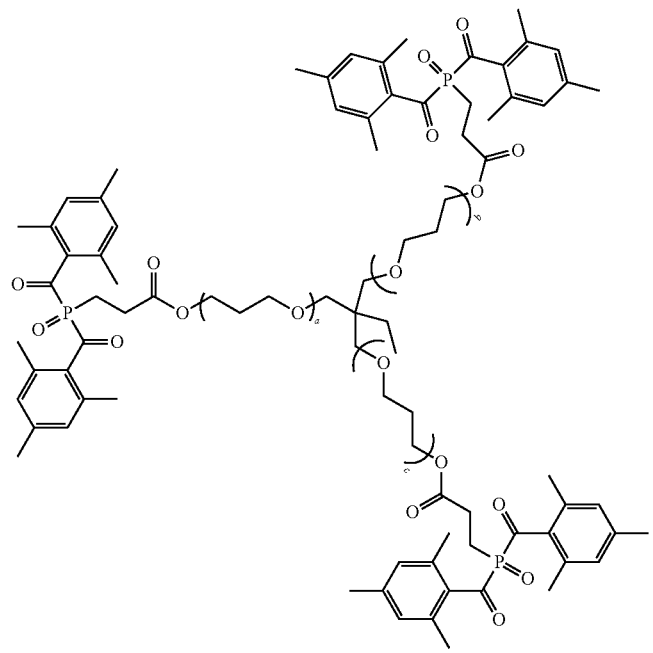
PI-2
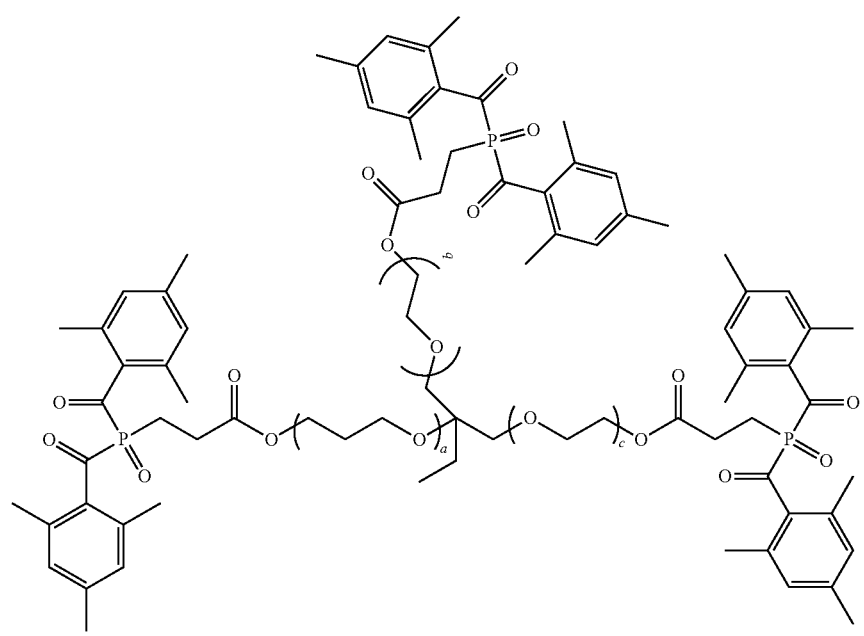

TABLE 1-continued
PI-3
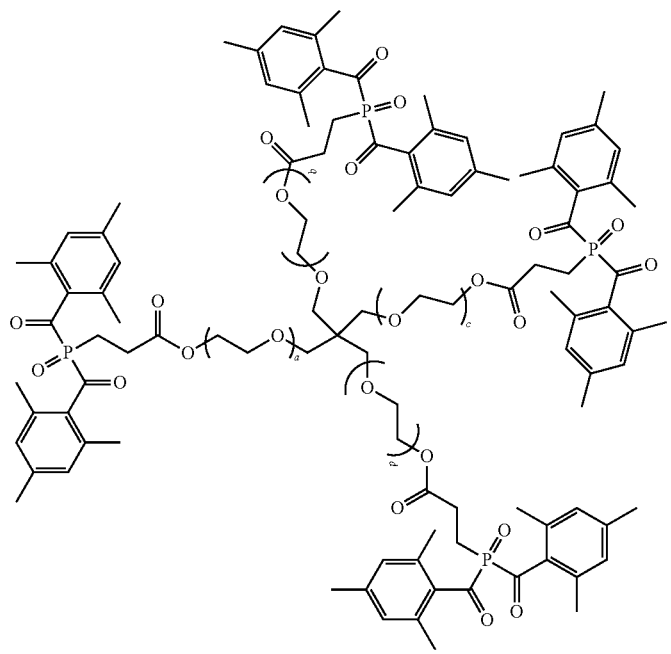
PI-4
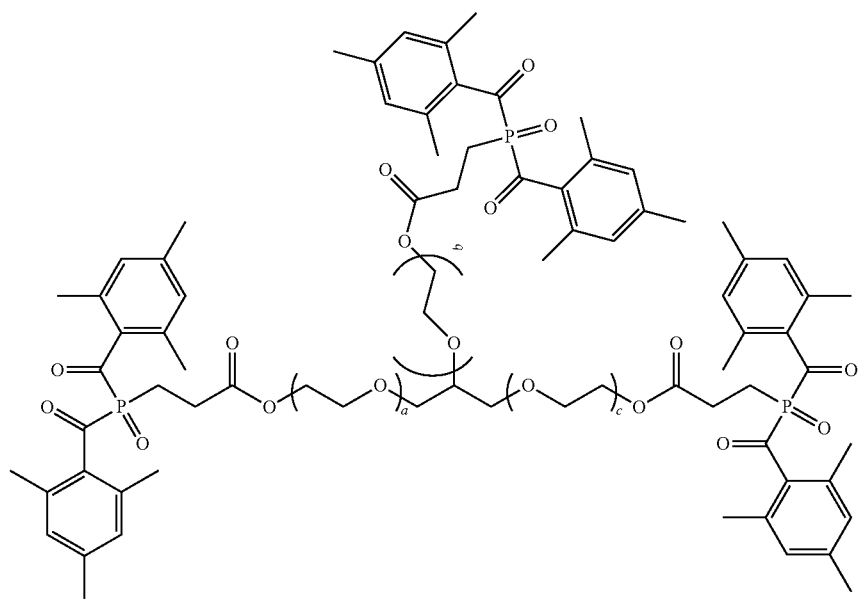
PI-5
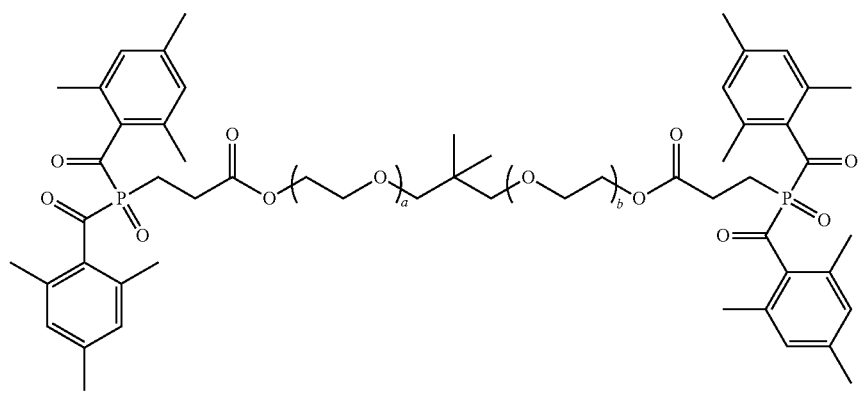

TABLE 1-continued
PI-6
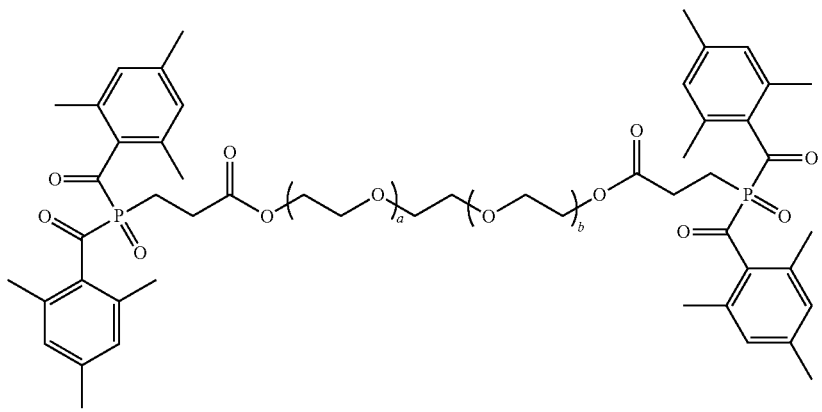
PI-7
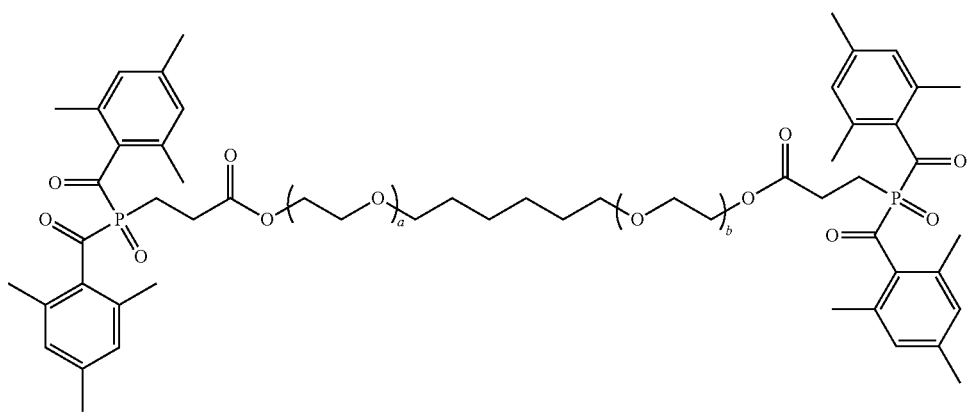
PI-8
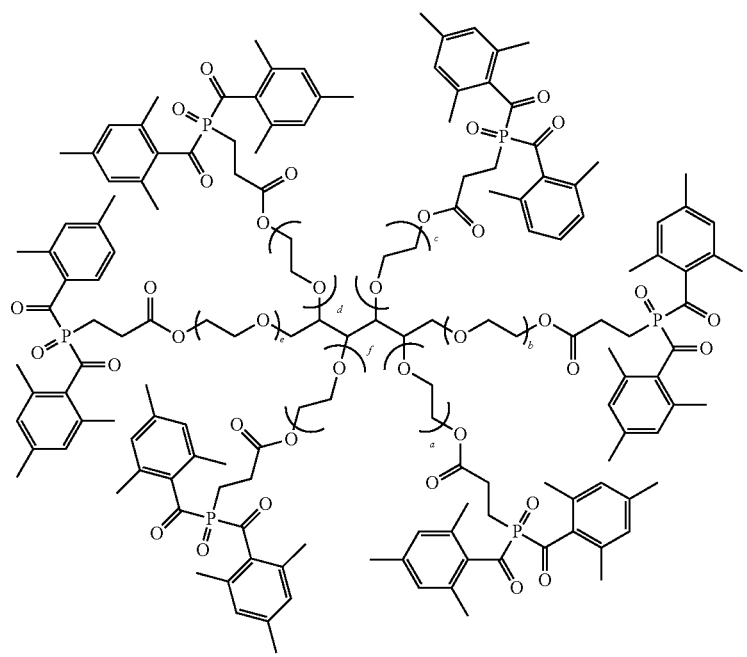

The compound of formula (I) can be prepared according conventional method known to the skilled in the art, for example according to the process described in WO2006/056541. Illustrative synthesis of representative compounds of formula (I) are reported in the examples which follow.

According to the invention, the photoinitiators of formula (I) can be used to prepare photocurable compositions comprising ethylenically unsaturated compounds b).

The unsaturated compounds b) can contain one or more olefinic double bonds. They can have low-molecular weight (monomeric) or high-molecular weight (oligomeric).

Examples of suitable low molecular weight monomers having one double bond are alkyl or hydroxyalkyl acrylates or methacrylates, such as methyl, ethyl, butyl, 2-ethylhexyl or 2-hydroxyethyl acrylate, isobornyl acrylate and methyl or ethyl methacrylate. Also of interest are resins modified with silicon or fluorine, e.g. silicone acrylates. Further examples of these monomers are acrylonitrile, acrylamide, methacrylamide, N-substituted (meth)acrylamides, styrene, alkylstyrenes and halogeno styrenes, vinyl esters such as vinyl acetate, vinyl ethers such as iso-butyl vinyl ether, N-vinylpyrrolidone, vinyl chloride or vinylidene chloride.

Examples of monomers having more than one double bond are the ethylene glycol diacrylate, propylene glycol diacrylate, neopentyl glycol diacrylate, hexamethylene glycol diacrylate, bisphenol A diacrylate, 4,4'-bis-(2-acryloyloxyethoxy)-di phenyl propane, tri methylolpropane triacrylate, pentaerythritol triacrylate or tetraacrylate, vinyl acrylate, divinyl benzene, divinyl succinate, diallyl phthalate, triallyl phosphate, triallyl isocyanurate or tris-(2-acryloylethyl) isocyanurate.

Examples of high-molecular weight (oligomeric) polyunsaturated compounds are acrylated epoxy resins, acrylated or vinyl-ether- or epoxy-group-containing polyesters, acrylated polyurethanes or acrylated polyethers. Further examples of unsaturated oligomers are unsaturated polyester resins which are usually prepared from maleic acid, phthalic acid and one or more diols and which have molecular weights of from about 500 to 3000. Such unsaturated oligomers can also be referred to as prepolymers.

Examples of compounds b), which are particularly suitable for the implementation of the present invention, are esters of ethylenically unsaturated carboxylic acids and polyols or polyepoxides, and polymers containing ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, as well as mixtures of one or more than one such polymers.

Illustrative examples of unsaturated carboxylic acids or anhydrides, useful for the preparation of said esters, are acrylic acid, methacrylic acid, maleic anhydride, crotonic acid, itaconic acid, cinnamic acid and unsaturated fatty acids such as linolenic acid and oleic acid. Acrylic and methacrylic acid are preferred.

Polyols which can be esterified are aromatic and aliphatic and cycloaliphatic polyols, preferably aliphatic and cycloaliphatic polyols.

Aromatic polyols are, for example, hydroquinone, 4,4'-dihydroxydiphenyl, 2,2-di(4-hydroxyphenyl) propane, as well as novolaks and resoles. Polyepoxides, which can be esterified, include those based on the said polyols, especially the aromatic polyols and epichlorohydrin. Also suitable as polyols are polymers and copolymers that contain hydroxyl groups in the polymer chain or in side groups, for example polyvinyl alcohol and copolymers thereof or polymethacrylic acid hydroxyalkyl esters or copolymers thereof. Further suitable polyols are oligoesters carrying hydroxyl terminal groups.

Examples of aliphatic and cycloaliphatic polyols include alkylenediols containing preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethyl cyclohexane, glycerol, tris (β-hydroxy-ethyl)amine, trimethylolethane, trimethylolpropane, pentaerythritol, dipentaerythritol and sorbitol.

Further suitable ethylenically unsaturated compounds b) are unsaturated polyamides obtained from unsaturated carboxylic acids and aromatic, aliphatic and cycloaliphatic polyamines having preferably from 2 to 6, preferably from 2 to 4, amino groups. Examples of such polyamines are: ethylenediamine, 1,2- or 1,3-propylenediamine, 1,2-, 1,3- or 1,4-butylenediamine, 1,5-pentylenediamine, 1,6-hexylenediamine, octylenediamine, dodecylene diamine, 1,4-diaminocyclohexane, isophoronediamine, phenylene diamine, bisphenylenediamine, di-(β-aminoethyl) ether, diethylene triamine, triethylenetetramine and di(β-aminoethoxy)- and di(β-aminopropoxy)ethane. Other suitable polyamines are polymers and copolymers which may contain additional amino groups in the side chain and oligoamides containing amino end groups.

Specific examples of such unsaturated polyamides are: methylenebisacrylamide, 1,6-hexamethylene bisacrylamide, diethylenetriamine trismethacrylamide, bis(methacrylamidopropoxy) ethane and N-[(β-hydroxyethoxy)ethyl]-acrylamide.

Unsaturated polyurethanes are also suitable for the implementation of the present invention, for example those derived from saturated or unsaturated diisocyanates and unsaturated or saturated diols. Polybutadiene and polyisoprene and copolymers thereof are also useful. Suitable comonomers include, for example, olefins, such as ethylene, propene, butene and hexene, (meth)acrylates, acrylonitrile, styrene and vinyl chloride.

Polymers having unsaturated (meth)acrylate groups in the side chain can be used as component b). They may typically be reaction products of epoxy resins based on novolak with (meth)acrylic acid; homo- or copolymers of vinyl alcohol or hydroxyalkyl derivatives thereof that have been esterified with (meth)acrylic acid; and homo- and co-polymers of (meth)acrylates that have been esterified with hydroxyalkyl (meth)acrylates.

The photocurable composition of the present invention can also comprise further photoinitiators c) and/or additives d), in addition to components a) and b).

The further photoinitiators c) can be present in an amount comprised between 0.5 and 15% by weight, of the solids content (excluding ethylenically unsaturated compounds, water or solvent) preferably between 1 and 10% by weight of the composition.

Examples of suitable other photoinitiators c) are camphorquinone, benzophenone, benzophenone derivatives, acetophenone, acetophenone derivatives, dialkoxyacetophenones, α-hydroxyketones, α-aminoketones, 4-aroyl-1,3-dioxolanes, benzoin alkyl ethers and benzil ketals, e.g. benzil dimethyl ketal, ketosulfones, e.g 1-[4-[(4-benzoyl-phenyl)-thio]-phenyl]-2-methyl-2-[(4-methyl-phenyl)-sulfonyl]-propan-1-one (Esacure 1001, from IGM Resins B.V.), 3-ketocoumarins, for example as described in EP2909243 and WO2017216699, phenylglyoxylates and derivatives thereof, dimeric phenyl glyoxylates, peresters, e.g. benzophenonetetracarboxylic acid peresters, for example as described in EP 126 541, acylphosphine photoinitiators (which can be chosen among mono-acylphosphine oxides, bis-acylphosphine oxides, tris-acylphosphine oxides and multifunctional mono- or bisacylphosphine oxides), halomethyltriazines, hexaaryl bisimidazole/coinitiator systems, e.g. ortho-chlorohexaphenylbisimidazole in combination with 2-mercaptobenzothiazole; ferrocenium compounds or titanocenes, for example dicyclopentadienyl-bis(2,6-difluoro-3-pyrrolophenyl)titanium; O-acyloxime ester photoinitiators.

Examples of α-hydroxyketones and α-aminoketones are 1-hydroxy cyclohexylphenyl ketone, 2-hydroxy-2-methyl-1-phenyl-propane-1-one, 1-[4-(2-hydroxyethoxy)phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one), 2-hydroxy-1-{4-[4-(2-hydroxy-2-methyl-propionyl)-phenoxy]-phenyl}-2-methyl-propan-1-one, 2-methyl-1-(4-methylthiophenyl)-2-morpholinopropane-1-one), 2-benzyl-2-di methylami no-1-(4-morpholinophenyl)-butane-1-one, and (2-(di methylami no)-2-[(4-methyl phenyl)methyl]-1-[4-(4-morpholinyl)phenyl]-1-butanone).

Examples of O-acyloxime ester photoinitiators are 1,2-octanedione, 1-[4-(phenylthio)phenyl]-2-(O-benzoyloxime), ethanone 1-[9-ethyl-6-(2-methylbenzoyl)-9H-carbazole-3-yl] 1-(O-acetyloxime) or those described in GB 2339571.

Examples of acylphosphine photoinitiators include, but are not limited to, bis(2,4,6-trimethylbenzoyl)phenylphosphine oxide, bis(2,6-dimethoxybenzoyl)-2,4,4-trimethylpentyl phosphine oxide, bis(2,4,6-trimethylbenzoyl)-(2,4-dipentyloxyphenyl), 2,4,6-trimethylbenzoyl-diphenyl phosphine oxide and ethyl (2,4,6-trimethylbenzoyl) phenyl phosphinate, Phenyl(2,4,6-trimethylbenzoyl)phosphinic acid glycerol ethoxylated triester (Omnipol TP from IGM Resins B.V.).

Examples of the halomethyltriazines based photoinitiators are 2-[2-(4-methoxy-phenyl)-vinyl]-4,6-bis-trichloromethyl [1,3,5]triazine, 2-(4-methoxy-phenyl)-4,6-bis-trichloromethyl [1,3,5]triazine, 2-(3,4-dimethoxyphenyl)-4,6-bis-trichloromethyl [1,3,5]triazine, 2-methyl-4,6-bis-trichloromethyl [1,3,5] triazine.

Cationic photoinitiators can be also used as the further photoinitiators c), when the photocurable compositions according to the invention are used in hybrid systems (which in this connection mean mixtures of free-radically and cationically curing systems). Examples of suitable cationic photoinitiators are aromatic sulfonium, phosphonium or iodonium salts, as described e.g. in U.S. Pat. No. 4,950,581, or cyclopentadienylarene-iron(II) complex salts, e.g. ($\eta^6$-isopropylbenzene)($\eta^5$-cyclopentadienyl) iron(II) hexafluorophosphate or photolatent acids based on oximes, as described, for example, in GB 2 348 644, U.S. Pat. Nos. 4,450,598, 4,136,055, WO 00/10972 and WO 00/26219.

Additives d) can be, for example, photosensitizers, accelerators/co-initiators, thermal initiators, binders, stabilizers, and mixture thereof.

The photocuring process can also be improved by the addition, as further additives (d), of at least a photosensitizer from 0.05 to 12% by weight, preferably from 0.1 to 10% by weight.

Examples of photosensitizers are those commonly used in the art, aromatic carbonyl compounds, e.g. benzophenones, thioxanthones, anthraquinones and 3-acylcoumarin derivatives, terphenyls, styryl ketones, and 3-(aroylmethylene)-thiazolines, camphorquinones and also eosin, rhodamine and erythrosine dyes.

Examples of thioxanthones are thioxanthone, 2-isopropyl thioxanthone, 2-chloro thioxanthone, 2-dodecyl thioxanthone, 2,4-diethyl thioxanthone, 2,4-dimethyl thioxanthone, 1-methoxycarbonyl thioxanthone, 2-ethoxycarbonyl thioxanthone, 3-(2-methoxyethoxycarbonyl) thioxanthone, 4-butoxycarbonyl thioxanthone, 3-butoxycarbonyl-7-methyl thioxanthone, 1-cyano-3-chloro thioxanthone, 1-ethoxycarbonyl-3-chloro thioxanthone, 1-ethoxycarbonyl-3-ethoxy thioxanthone, 1-ethoxycarbonyl-3-amino thioxanthone, 1-ethoxycarbonyl-3-phenylsulfuryl thioxanthone, 3,4-di[2-(2-methoxyethoxy)ethoxycarbonyl]thioxanthone, 1-ethoxycarbonyl-3-(1-methyl-1-morpholinoethyl) thioxanthone, 2-methyl-6-dimethoxymethyl thioxanthone, 2-methyl-6-(1,1-dimethoxybenzyl) thioxanthone, 2-morpholinomethyl thioxanthone, 2-methyl-6-morpholinomethyl thioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxy thioxanthone, 6-ethoxycarbonyl-1-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propan-aminium chloride, or those described in the patent application PCT/EP2011/069514, such as n-dodecyl-7-methyl-thioxanthone-3-carboxylate and N,N-disobutyl-7-methyl-thioxanthone-3-carbamide. Also suitable are polymeric thioxanthone derivatives (e.g. Omnipol TX from IGM Resins B.V., Genopol TX-1 from Rahn A.G., Speedcure 7010 from Lambson Limited).

Example of benzophenones are benzophenone, 4-phenyl benzophenone, 4-methoxy benzophenone, 4,4'-dimethoxybenzophenone, 4,4'-dimethyl benzophenone, 4,4'-dichloro benzophenone, 4,4'-dimethylamino benzophenone, 4,4'-diethylamino benzophenone, 4-methyl benzophenone, 2,4,6-trimethyl benzophenone, 4-(4-methylthiophenyl) benzophenone, 3,3'-dimethyl-4-methoxy benzophenone, methyl 2-benzoyl benzoate, 4-(2-hydroxyethylthio) benzophenone, 4-(4-tolylthio) benzophenone, 4-benzoyl-N,N,N-trimethylbenzene methanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl) benzophenone, 4-benzoyl-N,N-dimethyl-N-[2-(1-oxo-2-propenyl)oxylethyl-benzene methanaminium chloride. Also suitable are polymeric benzophenone derivatives (e.g.Omnipol BP, Omnipol 2702 and Omnipol 682 all from IGM Resins B.V., Genopol BP-2 from Rahn A.G. and Speedcure 7005 from Lambson Limited).

Examples of 3-acylcoumarin derivatives are 3-benzoyl coumarin, 3-benzoyl-7-methoxy coumarin, 3-benzoyl-5,7-di(propoxy) coumarin, 3-benzoyl-6,8-dichloro coumarin, 3-benzoyl-6-chloro coumarin, 3,3'-carbonyl-bis[5,7-di (propoxy) coumarin], 3,3'-carbonyl-bis(7-methoxy coumarin), 3,3'-carbonyl-bis(7-diethylamino coumarin), 3-isobutyroyl coumarin, 3-benzoyl-5,7-dimethoxy coumarin, 3-benzoyl-5,7-diethoxy coumarin, 3-benzoyl-5,7-dibutoxy coumarin, 3-benzoyl-5,7-di(methoxyethoxy) coumarin, 3-benzoyl-5,7-di(allyloxy) coumarin, 3-benzoyl-7-dimethylamino coumarin, 3-benzoyl-7-diethylamino coumarin, 3-isobutyroyl-1,7-dimethylamino coumarin, 5,7-dimethoxy-3-(1-naphthoyl) coumarin, 5,7-dimethoxy-3(1-naphthoyl)-coumarin, 3-benzoylbenzo[f]coumarin, 7-diethylamino-3-thienoyl coumarin, 3-(4-cyanobenzoyl)-5,7-dimethoxy coumarin, or those described in EP2909243 and WO2017216699.

Examples of 3-(aroylmethylene) thiazolines are 3-methy-1,2-benzoylmethylene-β-naphtho thiazoline, 3-methyl-2-benzoylmethylene-benzo thiazoline, 3-ethyl-2-propionylmethylene-β-naphtho thiazoline; Examples of other aromatic carbonyl compounds are acetophenone, 3-methoxyacetophenone, 4-phenylacetophenone, benzil, such as that described in WO 2013/164394, 2-acetylnaphthalene, 2-naphthaldehyde, 9,10-anthraquinone, 9-fluorenone, dibenzosuberone, xanthone, 2,5-bis(4-diethylaminobenzylidene) cyclopentanone, α-(para-dimethylamino benzylidene); ketones, such as 2-(4-dimethylamino-benzylidene)-indan-1-one or 3-(4-dimethylaminophenyl)-1-indan-5-yl-propenone, 3-phenylthiophthalimide, N-methyl-3,5-di(ethylthio) phthalimide.

The photocurable composition of the invention can also conveniently include accelerators/co-initiators, e.g. alcohols, thiols, thioethers, amines or ethers that have an available hydrogen, bonded to a carbon adjacent to the heteroatom, disulfides and phosphines, as described e.g. in EP 438 123 and GB 2 180 358. Such accelerators/co-initiators are generally present in an amount comprised between 0.2 and 15% by weight, preferably from 0.2 to 8% by weight.

Suitable examples of amine accelerators/co-initiators include, but are not limited to, aliphatic, cycloaliphatic, aromatic, aryl-aliphatic, heterocyclic, oligomeric or polymeric amines. They can be primary, secondary or tertiary amines, for example butyl amine, dibutyl amine, tributyl amine, cyclohexyl amine, benzyldimethyl amine, di-cyclohexyl amine, N-phenyl glycine, triethyl amine, phenyldiethanol amine, triethanolamine, piperidine, piperazine, morpholine, pyridine, quinoline, esters of dimethylamino benzoic acid, Michler's ketone (4,4'-bis-dimethyl aminobenzophenone) and corresponding derivatives.

As the amine accelerators/co-initiators, an amine-modified acrylate compound can be used: examples of such amine-modified acrylate include acrylates modified by reaction with a primary or secondary amine that are described in U.S. Pat. No. 3,844,916, EP 280222, U.S. Pat. No. 5,482,649 or 5,734,002.

Multifunctional amine and polymeric amine derivatives are also suitable as co-initiators some examples are Omnipol ASA from IGM Resins B.V., Genopol AB-2 from Rahn A.G., Speedcure 7040 from Lambson Limited or those described in US2013/0012611.

The curing process according to the invention, especially in the case of pigmented compositions (e.g. compositions pigmented with titanium dioxide), may also be assisted by the addition, as additional additive d), of a thermal initiator, a compound that forms free radicals when heated, e.g. an azo compounds, such as 2,2'-azobis(4-methoxy-2,4-dimethylvaleronitrile), a triazene, diazosulfide, pentazadiene or a peroxy compound, for example a hydroperoxide or peroxycarbonate, e.g. tert-butyl hydroperoxide, as described e.g. in EP 245 639.

Binders may also be added to the photocurable composition of the invention. The addition of binders is particularly advantageous when the photocurable compounds are liquid or viscous substances. The amount of binder may be, for example, from 5 to 60% by weight, preferably from 10 to 50% by weight. The choice of binder is made in accordance with the field of use and the properties required therefor, such as developability in aqueous and organic solvent systems, adhesion to substrates and sensitivity to oxygen.

Suitable binders are, for example, polymers having a molecular weight of approximately from 5000 to 2 000 000, preferably from 10 000 to 1 000 000. Illustrative examples are: homo- and copolymers of acrylates and methacrylates, e.g. copolymers of methyl methacrylate/ethyl acrylate/methacrylic acid, poly(methacrylic acid alkyl esters), poly (acrylic acid alkyl esters); cellulose esters and ethers, such as cellulose acetate, cellulose acetate butyrate, methylcellulose, ethylcellulose; polyvinylbutyral, polyvinylformal, cyclised rubber, polyethers such as polyethylene oxide, polypropylene oxide, polytetrahydrofuran; polystyrene, polycarbonates, polyurethanes; chlorinated polyolefins, as e.g. polyvinyl chloride, co-polymers of vinyl chloride/vinylidene chloride, co-polymers of vinylidene chloride with acrylonitrile, methyl methacrylate and vinyl acetate, polyvinyl acetate, co-poly (ethylene/vinyl acetate), polymers such as polycaprolactam and poly(hexamethylene adipamide), polyesters such as poly(ethylene glycol terephthalate) and poly(hexamethylene glycol succinate).

Suitable stabilizers are, for example, thermal inhibitors, such as hydroquinone, hydroquinone derivatives, p-methoxyphenol, β-naphthol or sterically hindered phenols, e.g. 2,6-di(tert-butyl)-p-cresol, which prevent premature polymerization. In order to increase dark storage stability it is possible to use, for example, copper compounds, such as copper naphthenate, stearate or octoate, phosphorus compounds, for example triphenylphosphine, tributylphosphine, triethyl phosphite, triphenyl phosphite or tribenzyl phosphite, quaternary ammonium compounds, e.g. tetramethylammonium chloride or trimethylbenzylammonium chloride, or hydroxylamine derivatives, e.g. N,N-diethylhydroxylamine. For the purpose of excluding atmospheric oxygen during polymerization it is possible to add paraffin or similar wax-like substances which, being insoluble in the polymer, migrate to the surface at the beginning of the polymerization and form a transparent surface layer which prevents air from entering.

It is also possible to add a light stabilizer, such as UV absorbers, e.g. hydroxyphenylbenzotriazole, hydroxyphenylbenzophenone, oxalic acid amide or hydroxyphenyl-s-triazine type. Such compounds can be used on their own or in the form of mixtures, with or without the use of sterically hindered amines (HALS).

The photocurable compositions according to the invention may also comprise, as further additives d), photoreducible dyes, e.g. a xanthene, benzoxanthene, benzothioxanthene, thiazine, pyronin, porphyrin or acridine dye, and/or radiation cleavable trihalomethyl compounds. These compounds are described, for example, in EP445624.

Further customary additives d) are, depending upon the intended use, optical brighteners, fillers, pigments, both white and colored pigments, colorants, antistatics, wetting agents or flow improvers. Additives customary in the art, e.g. antistatics, flow improvers and adhesion enhancers, can also be used.

It is also possible for chain-transfer reagents customary in the art to be added to the compositions according to the invention. Examples are mercaptans, amines and benzothiazole.

For curing thick and pigmented coatings it is suitable to add glass microbeads or pulverised glass fibers, as described e.g. in U.S. Pat. No. 5,013,768.

The composition of the invention may also comprise colorants and/or white or colored pigments. Depending upon the intended use, both inorganic and organic pigments may be used. Such additives will be known to the person skilled in the art; some examples are titanium dioxide pigments, e.g. of the rutile or anatase type, carbon black, zinc oxide, such as zinc white, iron oxides, such as iron oxide yellow, iron oxide red, chromium yellow, chromium green, nickel titanium yellow, ultramarine blue, cobalt blue, bismuth vanadate, cadmium yellow and cadmium red. Examples of organic pigments are mono- or bis-azo pigments, and also metal complexes thereof, phthalocyanine pigments, polycyclic pigments, e.g. perylene, anthraquinone, thioindigo, quinacridone or triphenylmethane pigments, and also diketopyrrolo-pyrrole, isoindolinone, e.g. tetrachloroisoindolinone, isoindoline, dioxazine, benzimidazolone and quinophthalone pigments. The pigments may be used in the formulations on their own or in admixture.

Depending upon the intended use, the pigments can be added to the formulations in amounts customary in the art, for example in an amount from 0.1 to 30% by weight or from 10 to 25% by weight, based on the total mass.

The composition may also comprise, for example, organic colorants of an extremely wide variety of classes. Examples are azo dyes, methine dyes, anthraquinone dyes and metal complex dyes. Usual concentrations are, for example, from 0.1 to 20% wt, especially from 1 to 5% wt, based on the total mass.

The choice of additives is governed by the field of use in question and the properties desired for that field. The additives d) described above are known in the art and are accordingly used in the amounts customary in the art.

The photocurable compositions of the invention are suitable for various purposes, for example as a printing ink, such as screen printing inks, flexographic printing inks, offset printing inks and inkjet printing inks, as clearcoats, as colored coats, as whitecoats, for example for wood or metal, as powder coatings, as coating materials inter alia for paper, wood, metal or plastics, as daylight-curable paints for marking structures and roads, for photographic reproduction processes, for holographic recording materials, for image-recording processes or in the production of printing plates that can be developed using organic solvents or using aqueous-alkaline media, for the production of masks for screen printing, as dental filling compounds, as adhesives, as pressure-sensitive adhesives, as laminating resins, as photoresists, e.g. galvanoresists, as etch resists or permanent resists, both liquid and dry films, as photostructurable dielectrics, and as solder masks for electronic circuits, as resists in the production of color filters for any type of display screen or in the creation of structures during the manufacture of plasma displays and electroluminescent displays, in the production of optical switches, optical gratings (interference gratings), in the manufacture of three-dimensional articles by bulk curing (UV curing in transparent moulds) or according to the stereolithography process, as described, for example, in U.S. Pat. No. 4,575,330, in the manufacture of composite materials (e.g. styrene polyesters which may include glass fibers and/or other fibers and other adjuvants) and other thick-layered compositions, and other methods of printing in three dimensions well-known to one skilled in the art, in the coating or sealing of electronic components or as coatings for optical fibers.

The photocurable compositions of the invention may also be used in the so-called "3D printing" technique, also referred to as "additive manufacturing". This is a known technique which allows to make three dimensional solid objects based on digital data. According to another embodiment, the invention relates to a photocuring process for 3D printing and for the manufacture of articles by 3D printing, by using the photocurable compositions of the invention.

The photocurable compositions of the invention are also suitable for the production of optical lenses, e.g. contact lenses or Fresnel lenses, in the manufacture of medical apparatus, aids or implants, in dry film paints.

The photocurable compositions of the invention are also suitable for the preparation of gels having thermotropic properties. Such gels are described e.g. in DE 19700064 and EP 678534.

Any article comprising a compound of formula (I) or a photocurable compositions of the invention represents a further subject-matter of the invention.

The compounds and compositions according to the invention may also be used as free-radical photoinitiators or photoinitiating systems for radiation-curable powder coatings.

The photocurable compositions according to the invention are suitable, for example, as coating materials for all kinds of substrate, for example wood, textiles, paper, ceramics, glass, plastics, such as polyesters, polyethylene terephthalate, polyolefins and cellulose acetate, especially in the form of films, and also metals, such as Al, Cu, Ni, Fe, Zn, Mg or Co and GaAs, Si or $SiO_2$, to which a protective layer is to be applied or an image is to be applied e.g. by imagewise exposure.

According to another of its aspects, it is a further subject-matter of the invention a process for photocuring photopolymerizable compositions and inks, which process comprises:

I) preparing a photopolymerizable composition comprising:

a) from 50 to 99.9% by weight, preferably from 70 to 98.9% by weight, of the solids content, excluding water or solvent, of at least one ethylenically unsaturated compound;

b) from 0.1 to 35% by weight, preferably from 0.1 to 20% by weight, and more preferably from 0.2 to 15% by weight, of the solids content, excluding ethylenically unsaturated compounds, water or solvent, of at least one compound of Formula (I), as defined above;

II) photopolymerizing the composition of step I with a light source

Accordingly, a large number of the most varied kinds of light source may be used, the light source emits at wavelengths from approximately 200 nm to approximately 600 nm. Both point sources and planiform radiators (lamp carpets) are suitable. Examples are: carbon arc lamps, xenon arc lamps, medium pressure, high pressure and low pressure mercury arc radiators, doped, where appropriate, with metal halides (metal halide lamps), microwave-excited metal vapour lamps, excimer lamps, superactinic fluorescent tubes, fluorescent lamps, argon incandescent lamps, flash lamps, photographic floodlight lamps, light-emitting diodes (LED), electron beams, X-rays and lasers. The distance between the lamp and the substrate according to the invention to be exposed may vary according to the intended use and the type and strength of the lamp and may be, for example, from 1 cm to 150 cm.

Particularly preferred are LED light source emitting at wavelengths comprised between 365 nm and 420 nm, preferably 365 nm, 385 nm and 395 nm.

Said photopolymerizable composition may also be applied over a substrate already comprising a coated or printed layer. Said photopolymerizable composition may, after photopolymerization with said light source, be overprinted or overcoated with one or more compositions suitable for printing or coating.

The article obtained by applying said photopolymerizable composition to said substrate by said means of coating or printing, and photopolymerizing by said light source, with or without further elaboration of the article by further coating or printing, is a further subject-matter of this invention.

Surprisingly, we found that compounds of formula (I), compared to the compound described in U.S. Pat. No. 9,701,700 (Example 25a), show higher reactivity during the photopolimerization process a better solubility and a lower yellowing.

For instance, we found that compound of formula (I) described in the example 3 showed a reactivity superior to the compound described in U.S. Pat. No. 9,701,700 Example 25a when used in the same amount, although the molecular weight of the compound of example 3 is about the 25% higher. Representative preparation of bisacylphosphine oxides of formula I and photocurable compositions according to the invention, only for illustrative and not limitative purpose, are reported in the following examples.

EXAMPLES

Definitions and Apparatus

Mes=mesityl (that is, 2,4,6-trimethylphenyl)
DME=1,2-dimethoxyethane
$^1$H NMR spectra were recorded with a Bruker Avance 400 MHz or a Bruker
DMX 500 MHz or a Bruker DMX 600 MHz.
Infra Red spectra were recorded with a FT-IR 430—Jasco.

Example 1

Synthesis of PI-1 (Wherein a+b+c=6)

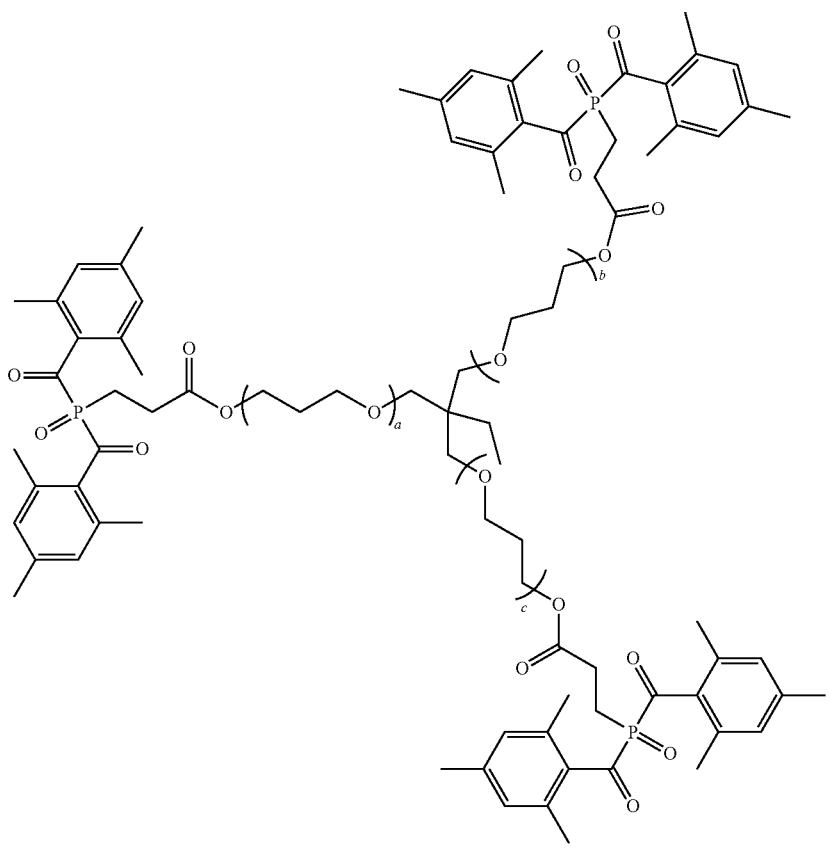

A solution of HP(COMes)$_2$ (700 mg, 2.146 mmol) and trimethylamine (30 μL, 0.215 mmol) in DME (6 mL) was prepared in a 20 mL Schlenk flask. Then trimethylolpropane propoxylate [6PO] triacrylate (322 mg, 0.501 mmol) was added and the reaction mixture was stirred at 50° C. for 24 h. The mixture was diluted with toluene (10 ml) and washed with HCl 1N. Subsequently, aqueous hydrogen peroxide (2 ml) was added and the mixture was stirred at 40° C. for 1 h. The organic layer was washed twice with an aqueous solution of NaHCO$_3$ 10% (2×10 ml), dried over sodium sulfate and the solvent was removed under reduced pressure. The product was purified by flash chromatography (dichloromethane:methanol=97:3) to obtain 555 mg (yield=68%) of the pure product.

$^1$H NMR (CDCl$_3$, δ ppm): 0.77-0.85 (m, 3H), 1.14-1.23 (m, 18H), 1.31-1.40 (m, 2H), 2.22 (s, 36H), 2.27 (s, ~18H), 2.46-2.54 (m, 6H), 2.59-2.65 (m, 6H), 3.18-4.0 (m, ~22H), 5.02-5.18 (m, 2H), 6.84 (s, 12H).

Example 2

Synthesis of PI-2 (Wherein a+b+c=3)

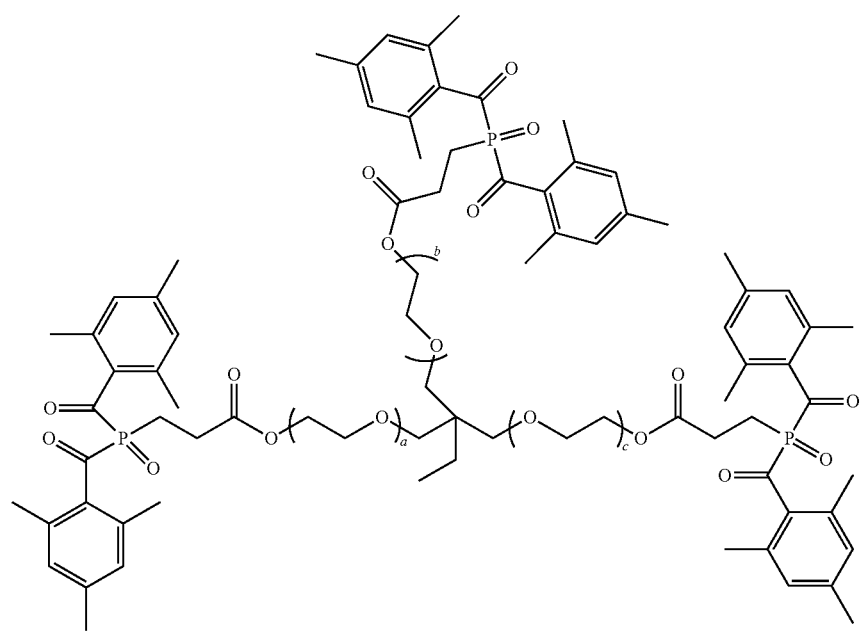

A solution of HP(COMes)$_2$ (700 mg, 2.146 mmol) and trimethylamine (30 μL, 0.215 mmol) in DME (6 mL) was prepared in a 20 mL Schlenk flask. Then trimethylolpropane [3EO] triacrylate (214 mg, 0.501 mmol) was added and the reaction mixture was stirred at 50° C. for 24 h. The mixture was diluted with toluene (10 ml) and washed with HCl 1N. Subsequently, aqueous hydrogen peroxide (2 ml) was added and the mixture was stirred at 40° C. for 1 h. The organic layer was washed twice with an aqueous solution of NaHCO$_3$ 10% (2×10 ml), dried over sodium sulfate and the solvent was removed under reduced pressure. The product was purified by flash chromatography (dichloromethane:methanol=97:3) to obtain 239 mg (yield=42%) of the pure product.

$^1$H NMR (CDCl$_3$, δ ppm): 0.77-0.86 (t, 3H), 1.33-1.44 (q, 2H), 2.22 (s, 36H), 2.26 (s, 18H), 2.46-2.55 (m, 6H), 2.60-2.69 (m, 6H), 3.24-4.30 (m, ~18H), 6.83 (s, 12H).

Example 3

Synthesis of PI-2 (Wherein a+b+c=9)

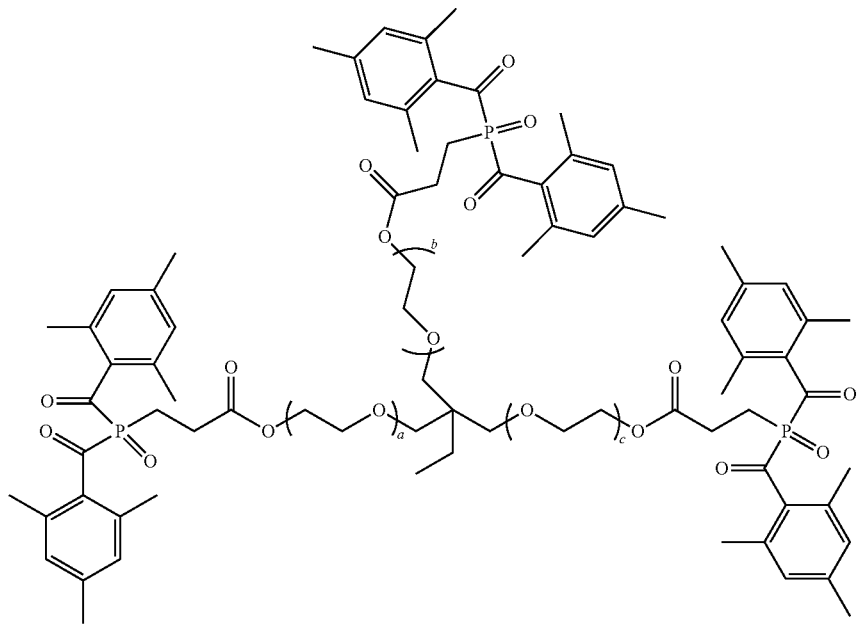

A solution of HP(COMes)$_2$ (700 mg, 2.146 mmol) and trimethylamine (30 µL, 0.215 mmol) in DME (6 mL) was prepared in a 20 mL Schlenk flask. Then trimethylolpropane [9EO] triacrylate (346 mg, 0.501 mmol) was added and the reaction mixture was stirred at 50° C. for 24 h. The mixture was diluted with toluene (10 ml) and washed with HCl 1N. Subsequently, aqueous hydrogen peroxide (2 ml) was added and the mixture was stirred at 40° C. for 1 h. The organic layer was washed twice with an aqueous solution of NaHCO$_3$ 10% (2×10 ml), dried over sodium sulfate and the solvent was removed under reduced pressure. The product was purified by flash chromatography (dichloromethane:methanol=97:3) to obtain 502 mg (yield=60%) of the pure product.

$^1$H NMR (CDCl$_3$, δ ppm): 0.78-0.85 (t, 3H), 1.33-1.40 (q, 2H), 2.22 (s, 36H), 2.26 (s, 18H), 2.46-2.55 (m, 6H), 2.60-2.70 (m, 6H), 3.20-4.29 (m, ~42H), 6.83 (s, 12H).

Example 4

Synthesis of PI-2 (Wherein a+b+c=15)

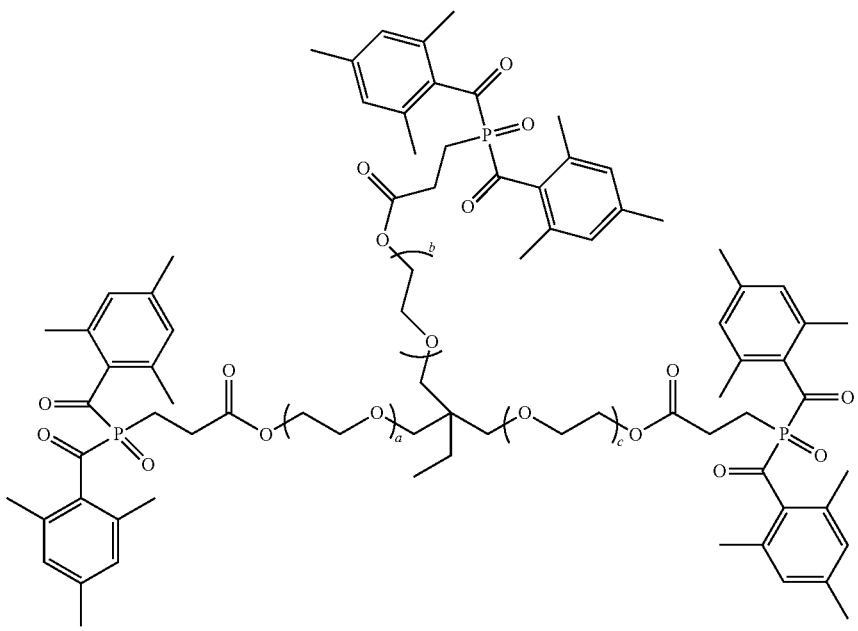

A solution of HP(COMes)₂ (700 mg, 2.146 mmol) and trimethylamine (30 µL, 0.215 mmol) in DME (6 mL) was prepared in a 20 mL Schlenk flask. Then trimethylolpropane [15EO] triacrylate (479 mg, 0.501 mmol) was added and the reaction mixture was stirred at 50° C. for 24 h. The mixture was diluted with toluene (10 ml) and washed with HCl 1 N. Subsequently, aqueous hydrogen peroxide (2 ml) was added and the mixture was stirred at 40° C. for 1 h. The organic layer was washed twice with an aqueous solution of NaHCO₃ 10% (2×10 ml), dried over sodium sulfate and the solvent was removed under reduced pressure. The product was purified by flash chromatography (dichloromethane:methanol=97:3) to obtain 549 mg (yield=57%) of the pure product.

¹H NMR (CDCl₃, δ ppm): 0.78-0.85 (t, 3H), 1.33-1.40 (q, 2H), 2.22 (s, 36H), 2.27 (s, 18H), 2.46-2.56 (m, 6H), 2.60-2.72 (m, 6H), 3.22-4.26 (m, ~66H), 6.84 (s, 12H).

Example 5

Synthesis of PI-3 (Wherein a+b+c+d=5)

NaHCO₃ 10% (2×10 ml), dried over sodium sulfate and the solvent was removed under reduced pressure. The product was purified by flash chromatography (dichloromethane:methanol=97:3) to obtain 203 mg (yield=33%) of the pure product.

¹H NMR (CDCl₃, δ ppm): 2.22 (s, 48H), 2.25 (s, 24H), 2.45-2.60 (m, 8H), 2.60-2.79 (m, 8H), 3.32-4.29 (m, 24H), 6.82 (s, 16H).

Examples 6

Comparative Tests

The multifunctional bisacylphosphine oxide of the invention, were compared with the multifunctional bisacylphosphine oxide of the prior art prepared as described in U.S. Pat. No. 9,701,700 Example 25a (COMP-1).

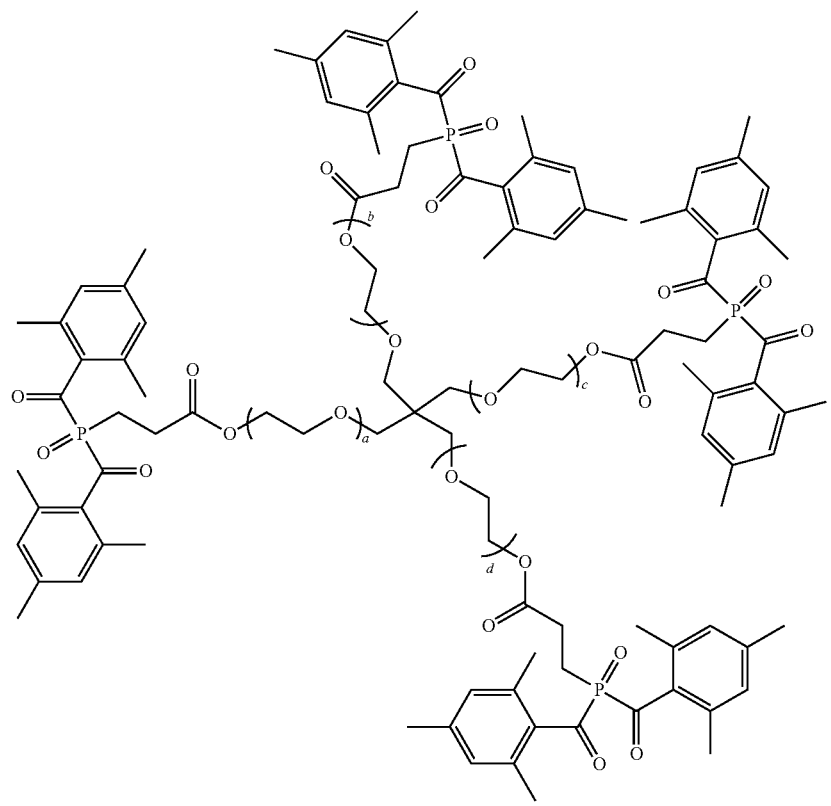

A solution of HP(COMes)₂ (700 mg, 2.146 mmol) and trimethylamine (30 µL, 0.215 mmol) in DME (6 mL) was prepared in a 20 mL Schlenk flask. Then pentaerythritol [5EO] tetra-acrylate (206 mg, 0.375 mmol) was added and the reaction mixture was stirred at 50° C. for 24 h. The mixture was diluted with toluene (10 ml) and washed with HCl 1N. Subsequently, aqueous hydrogen peroxide (2 ml) was added and the mixture was stirred at 40° C. for 1 h. The organic layer was washed twice with an aqueous solution of Example 6.1

Comparative Tests

Example 6.1.1

Solubility Test

The solubility of the multifunctional bisacylphosphine oxides was measured by dissolving the compounds of the examples 3 and 4 in TMPTA (Trimethylolpropane triacrylate) for 30 minutes at 25° C. Then the solutions were left at room temperature for 24 h. If no precipitation occurred, the product was considered soluble at that concentration. The results are shown in Table 2.

TABLE 2

| Photoinitiator | Solubility (% by weight) |
|---|---|
| COMP-1* | <2 |
| Example 3 | 7 |
| Example 4 | >10 |

*Comparative

From the data above is clear that compounds of Formula (I) are more soluble than the comparative (COMP-1 Ex. 25a U.S. Pat. No. 9,701,700).

Example 6.1.2

Clear Formulation

The photopolymerizable compositions for the test were prepared dissolving the photoinitiators at a concentration of 3% by weight (wt) each in a mixture 99.5:0.5 wt of Ebecryl 605 and Ebecryl 350 (Allnex).

The photopolymerizable compositions placed in the sample lodgment of a FT-IR (FT-IR 430-Jasco), were exposed to two different sources:
1) a LED source (400 nm) located at a distance of 25 mm from the sample and at an angle of 30°.
2) A Mercury lamp (160 W) located at a distance of 65 mm from the sample and at an angle of 30°.

IR spectra were acquired at constant time intervals during the photopolymerization and the reduction over the time of the area of the peaks at 1408 and 810 $cm^{-1}$ assigned to the acrylic double bonds was determined using the IR software. This allows quantifying the degree of polymerization and therefore the efficiency of the photoinitiator.

The results expressed as % of polymerization over the time, are reported in Table 3.

TABLE 3

| Photoinitiator | Mercury Lamp after 0.2" | Mercury Lamp after 1" | LED 400 nm after 0.5" | LED 400 nm after 2" |
|---|---|---|---|---|
| COMP-1* | 60 | 64 | 45 | 46 |
| Example 1 | 71 | 71 | 60 | 64 |
| Example 2 | 60 | 63 | 54 | 56 |
| Example 3 | 61 | 64 | 59 | 60 |
| Example 4 | 51 | 56 | 43 | 46 |
| Example 5 | 59 | 62 | 55 | 57 |

*Comparative

These tests confirm that compounds of Formula (I) have a reactivity comparable or superior than the comparative (COMP-1 Ex. 25a U.S. Pat. No. 9,701,700), when use in the same amount even if the molecular weight of the new compounds is from 9 to 33% higher.

Example 6.1.3

Tack-Free Clear Coating

The photopolymerizable compositions for the test were prepared by dissolving the photoinitiators at a concentration of 4% wt in a solution of PETIA (Pentaerythritol triacrylate) and Ebecryl 8602 (Allnex).

The photopolymerizable composition is spread with a thickness of 6 microns on a varnished cardboard using a bar-coater. Therefore is photopolymerized using:
1) an LED lamp at 395 nm (16 W/cm2)
2) a Mercury lamp (120 W/cm)

The results are express in meters per minutes as the maximum speed at which the tack-free is reached. (Table 4)

TABLE 4

| Photoinitiator | Tack-free (m/min) Mercury Lamp | Tack-free (m/min) LED 395 nm |
|---|---|---|
| COMP-1* | 25 | 14 |
| Example 3 | 33 | 17 |
| Example 4 | 24 | 14 |

*Comparative

These tests confirm that compounds of Formula (I) have a reactivity comparable or superior than the comparative (COMP-1, Ex. 25a U.S. Pat. No. 9,701,700).

Example 6.1.4

Yellowing

The yellowing of the film cured in example 6.1.2. was measured as Yellow Index (YI) using a BYK color guide 45/0. The results of the film exposed to the LED source are shown in Table 5.

TABLE 5

| Photoinitiator | YI |
|---|---|
| COMP-1* | 4.31 |
| Example 3 | 4.22 |
| Example 4 | 4.27 |

*Comparative

In this case the yellowing of the compounds of Formula (I) is always lower than the comparative compound (COMP-1, Ex. 25a U.S. Pat. No. 9,701,700)

Example 6.1.5

Cyan Inkjet Ink

The photopolymerizable compositions for the test were prepared by dissolving the photoinitiators at a concentration of 5.0% wt each in a cyan ink for ink-jet printing.

The photopolymerizable compositions placed in the sample lodgment of a FT-IR (FT-IR 430-Jasco), were exposed to two different sources:
1) a LED source (400 nm) located at a distance of 25 mm from the sample and at an angle of 30°.
2) A Mercury lamp (160 W) located at a distance of 65 mm from the sample and at an angle of 30°.

IR spectra were acquired at constant time intervals during the photopolymerization and the reduction over the time of the area of the peaks at 1408 $cm^{-1}$ and 810 $cm^{-1}$ assigned to the acrylic double bonds was determined using the IR software. This allows quantifying the degree of polymerization and therefore the efficiency of the photoinitiator.

The results expressed as % of polymerization over the time, are reported in Table 6.

TABLE 6

| Photoinitiator | Mercury Lamp after 0.2" | Mercury Lamp after 1" | LED 400 nm after 0.5" | LED 400 nm after 2" |
|---|---|---|---|---|
| COMP-1* | 24 | 62 | 37 | 43 |
| Example 1 | 29 | 60 | 26 | 31 |
| Example 2 | 35 | 66 | 46 | 51 |
| Example 3 | 35 | 66 | 37 | 43 |
| Example 4 | 27 | 60 | 35 | 40 |
| Example 5 | 34 | 67 | 46 | 52 |

*Comparative

These tests confirm that compounds of Formula (I) have a reactivity comparable or superior than the comparative (COMP-1, Ex. 25a U.S. Pat. No. 9,701,700).

As previously said, these examples confirm that the compounds of formula (I) are more soluble, less yellowing and more reactive than the comparative compound of the prior art (COMP-1, Ex. 25a U.S. Pat. No. 9,701,700). Surprisingly, we found that the new compounds of formula (I) are more reactive than the comparative compound when used in the same amount even if their molecular weight is from 9 to 33% higher, that confirms that the new compounds are really more reactive.

The invention claimed is:

1. Photoinitiators of formula (I):

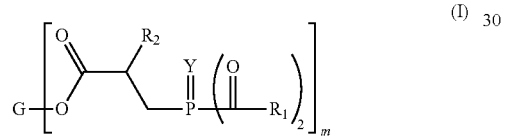

wherein:
m is from 3 to 8;
G is an alkoxylated polyhydroxy residue, wherein the polyhydroxy compound from which is derived has at least m hydroxy groups;
$R_1$ is selected from
  a $C_1$-$C_{18}$ alkyl group, optionally interrupted by one or more oxygen and/or sulfur atoms and/or one or more substituted or unsubstituted imino groups
  a $C_6$-$C_{12}$ aryl group;
  a $C_5$-$C_{12}$ cycloalkyl group,
  a five- to six-membered heterocyclic group, containing oxygen and/or nitrogen and/or sulfur atoms,
  where each of said groups may be independently substituted by aryl, alkyl, aryloxy, alkoxy, heterocyclic groups and/or heteroatoms;
$R_2$ is hydrogen or a $C_1$-$C_4$ alkyl group; and
Y is O or S;
provided that when G is

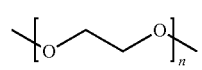

wherein n is 100, m is 2, $R_2$ is hydrogen and Y is O, then $R_1$ is not a 2,4,6-trimethylphenyl group (mesityl group).

2. The photoinitiators of claim 1, wherein in formula (I) m is from 3 to 6.

3. The photoinitiators of claim 1, wherein in formula (I) $R_1$ is selected from phenyl, 2,6-dichlorophenyl, 2,4,6-trichlorophenyl, 2,6-dimethylphenyl, 2,4,6-trimethylphenyl, 2,6-diethylphenyl, 2,6-dimethoxyphenyl, 2,6-diethoxyphenyl, α-naphthyl, 2,6-dinitrophenyl, 2,6-dimethylcyclohexyl, 2,6-diethylcyclohexyl, 2,6-dimethoxycyclohexyl, 2,6-diethoxycyclohexyl, 2,6-dichlorocyclohexyl, tert-butyl, pentyl, hexyl, heptyl, octyl and 2-ethylhexyl.

4. The photoinitiators of claim 1, wherein in formula (I) $R_2$ is hydrogen or methyl.

5. The photoinitiators of claim 1, wherein in formula (I) G is ethoxylated and/or propoxylated.

6. A photocurable composition comprising:
  a. from 50 to 99.9% by weight of solids content of at least one ethylenically unsaturated compound;
  from 0.1 to 35% by weight of the solids content of at least one compound of formula (I),

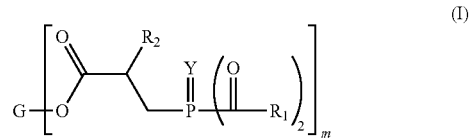

as defined above.

7. The photocurable composition of claim 6 comprising:
  a. from 70 to 98.9% by weight of the solids content of at least one ethylenically unsaturated compound;
  from 0.2 to 15% by weight of the solids content of at least one compound of formula (I),

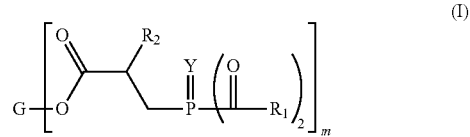

as defined above.

8. The photocurable composition of claim 6, further comprising:
  c. from 0.5 to 15% by weight of the solids content of another photoinitiator.

9. The photocurable composition of claim 6, further comprising:
  d. from 0.05 to 12% by weight of a photosensitizer.

10. A process for photocuring photopolymerizable compositions and inks, which process comprises:
  I. preparing a photopolymerizable composition comprising:
    a. from 50 to 99.9% by weight of solids content of at least one ethylenically unsaturated compound;
    from 0.1 to 35% by weight of solids content of at least one compound of formula (I),

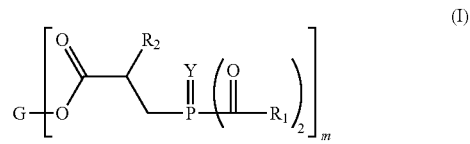

as defined above;
  II. photopolymerizing the composition of step I with a light source.

11. The process of claim 10, wherein the photopolymerization process is carried out with a light source emitting at wavelengths from approximately 200 nm to approximately 600 nm.

12. The process of claim 10, wherein the photopolymerization is carried out with a LED light source emitting at wavelengths comprised between 365 nm to 420 nm.

13. The process of claim 10, further comprising the step of applying said photopolymerizable composition to a substrate or other means of support prior to photopolymerizing it.

14. The photoinitiators of claim 2, wherein in formula (I) R1 is selected from phenyl, 2,6-dichlorophenyl, 2,4,6-trichlorophenyl, 2,6-dimethylphenyl, 2,4,6-trimethylphenyl, 2,6-diethylphenyl, 2,6-dimethoxyphenyl, 2,6-diethoxyphenyl, α-naphthyl, 2,6-dinitrophenyl, 2,6-dimethylcyclohexyl, 2,6-diethylcyclohexyl, 2,6-dimethoxycyclohexyl, 2,6-diethoxycyclohexyl, 2,6-dichlorocyclohexyl, tert-butyl, pentyl, hexyl, heptyl, octyl and 2-ethylhexyl.

15. The photoinitiators of claim 2, wherein in formula (I) R2 is hydrogen or methyl.

16. The photoinitiators of claim 3, wherein in formula (I) R2 is hydrogen or methyl.

17. The photoinitiators of claim 2, wherein in formula (I) G is ethoxylated and/or propoxylated.

18. The photoinitiators of claim 3, wherein in formula (I) G is ethoxylated and/or propoxylated.

19. The photoinitiators of claim 4, wherein in formula (I) G is ethoxylated and/or propoxylated.

\* \* \* \* \*